(12) United States Patent
Reddy et al.

(10) Patent No.: US 8,718,159 B2
(45) Date of Patent: May 6, 2014

(54) RECEIVER WITH CYCLIC PREFIX DETERMINATION

(75) Inventors: C Ashok Kumar Reddy, Bangalore (IN); Anupama Lakshmanan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/436,369

(22) Filed: Mar. 30, 2012

(65) Prior Publication Data

US 2013/0129006 A1 May 23, 2013

Related U.S. Application Data

(60) Provisional application No. 61/579,998, filed on Dec. 23, 2011, provisional application No. 61/562,196, filed on Nov. 21, 2011.

(51) Int. Cl.
*H04K 1/10* (2006.01)

(52) U.S. Cl.
USPC ........... 375/260; 327/100; 370/264; 370/540; 702/124

(58) Field of Classification Search
None
See application file for complete search history.

(56) References Cited

U.S. PATENT DOCUMENTS

| | | | |
|---|---|---|---|
| 2002/0122381 A1* | 9/2002 | Wu et al. | 370/208 |
| 2008/0056343 A1* | 3/2008 | Rajagopal et al. | 375/232 |
| 2013/0129007 A1 | 5/2013 | Reddy et al. | |

* cited by examiner

*Primary Examiner* — Adolf Dsouza
(74) *Attorney, Agent, or Firm* — Sterne, Kessler, Goldstein & Fox P.L.L.C.

(57) ABSTRACT

A user equipment (UE) performs a transform domain (DFT) based method to detect the cyclic prefix (CP) length that is being used by a base station for cellular communications. The detected CP length is then used to reduce the amount of time required to complete the synchronization and cell search procedures. In particular, the UE uses the detected CP length information to obtain Cell Identification parameters (NID1, NID2) along with information including a Maximum energy Tap location and a reference signal receive power (RSRP) while completing the synchronization and cell search procedures.

15 Claims, 12 Drawing Sheets

TRANSMITTER

TRANSMITTER

RECEIVER WITH CYCLIC PREFIX DETERMINATION

CROSS REFERENCE TO RELATED APPLICATION

This non-provisional application claims the benefit of U.S. Provisional Application No. 61/562,196, filed Nov. 21, 2011, and of U.S. Provisional Application No. 61/579,998, filed Dec. 23, 2011, the contents of all of which are herein incorporated by reference in their entirety.

FIELD OF THE INVENTION

The present disclosure relates to mitigating the adverse effects of inter-symbol interference (ISI) at the receiver of a network system such as, for example, an Orthogonal Frequency Division Multiplexing (OFDM) system. The present disclosure also relates to reducing the amount of time required by a receiver to complete the initial synchronization procedure and cell search procedure.

BACKGROUND

Background Art

In OFDM systems using wireless channels, when a data signal is transmitted over a wireless channel, the signal can be distorted due to multipath. Multipath occurs when the transmitted signal travels over multiple paths, and the multiple signals reach the receiver at different times depending on the distances traveled along the respective multiple paths. The distances traveled along the respective multiple paths are different because some paths are more direct than others. As such, the same signal travels over multiple paths and reaches the receiver at different times. As explained below, the delays between the different times at which the same signal is received at the receiver causes ISI.

The data included in the signal is organized in frames which contain a plurality of symbols. ISI can occur when the same symbol is received at different times due to channel multipath, and therefore may interfere with an adjacent symbol, causing bit errors.

Channel estimation is a process used to estimate the frequency and spatial response of a channel or the path between a transmitter and receiver, and is used to configure receiver parameters (e.g. gain control, equalizer parameters, and the like). One or more pilot signals may be sent from transmitter and receiver, where the pilot signals are previously known to the receiver. Upon reception of the transmitted signal, the receiver compares the received pilot information to the known pilot information and derives the channel estimate based on the results of the comparison. The pilot signals may be interspersed with the data signals to periodically perform the channel estimate during data transmission. Similar to the actual data signals, ISI also has a deleterious effect on pilot reception and therefore channel estimation. Further, since channel estimation is used to configure receiver parameters, any ISI effects on pilot reception has an even greater effect on future data signal reception and bit error rate (BER).

Therefore, there is a need to mitigate the effects of ISI on the accuracy of the channel estimation process.

BRIEF SUMMARY

An embodiment of the present disclosure includes a transmitter including a signal generator to generate an analytic signal including a digital signature, the analytic signal being in frequency domain, a converter to convert the analytic signal in frequency domain to a time domain signal in time domain, and a shaper to generate a cyclic prefix based on the time domain signal, and to attach the cyclic prefix to the time domain signal to output a pilot signal to be transmitted via an antenna.

Another embodiment of the present disclosure includes a method for increasing an effective length of a cyclic prefix including generating an analytic signal having a digital signature, the analytic signal being in frequency domain, converting the analytic signal in frequency domain to a time domain signal in time domain, generating a cyclic prefix based on the time domain signal, and attaching the cyclic prefix to the time domain signal to output a pilot signal, and transmitting the pilot signal.

A further embodiment of the present disclosure includes a method including receiving a received signal in time domain, obtaining a Cyclic Prefix (CP) correlation and spectral components associated with a plurality of possible cyclic prefix lengths, distinguishing spectral components associated with a first cyclic prefix length from spectral components associated with a second cyclic prefix length, calculating a first metric based on the spectral components associated with the first cyclic prefix length, and setting an order of cyclic prefix lengths based on a comparison of the first metric and the second metric with a threshold, the order including the first cyclic prefix length and the second cyclic prefix length.

A further embodiment of the present disclosure includes a receiver configured to receive a received signal in time domain, obtaining a Cyclic Prefix (CP) correlation and spectral components associated with a plurality of possible cyclic prefix lengths, a deciphering module to distinguish spectral components associated with a first cyclic prefix length from spectral components associated with a second cyclic prefix length, a calculator to calculate a first metric based on the spectral components associated with the first cyclic prefix length, and to calculate a second metric based on the spectral components associated with the second cyclic prefix length, and an ordering module to set an order of cyclic prefix lengths based on a comparison of the first metric and the second metric with a threshold, the order including the first cyclic prefix length and the second cyclic prefix length. In one embodiment, the CP correlation is obtained before converting the received signal to frequency domain, and an FFT operation is performed on the obtained CP correlation to acquire the spectral components.

BRIEF DESCRIPTION OF THE DRAWINGS

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

ISI Mitigation During Pilot Reception

Figure 1A:
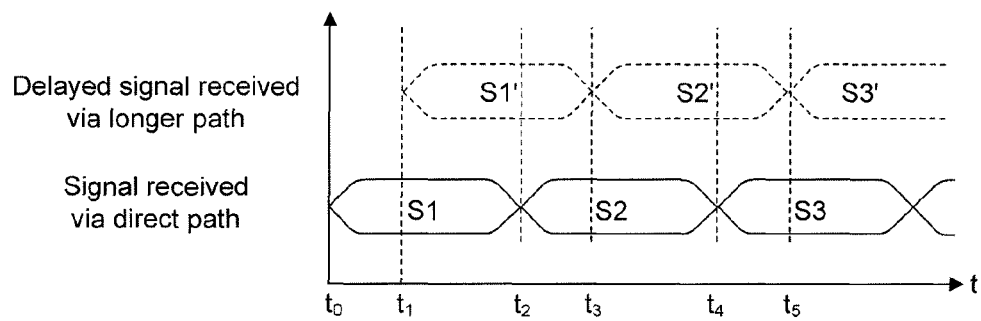
FIG. 1A illustrates a frame including a plurality of symbols being received at two different times via two different paths, leading to ISI.

To illustrate ISI, FIG. 1A shows a frame including a plurality of symbols (S1, S2, S3) being received at two different times via two different paths, a direct path and a longer path. The symbols S1, S2, S3 are received via the direct path at times $t_0$, $t_2$, $t_4$ respectively. The same symbols, when received via the longer path, are received as delayed symbols S1', S2', S3' at delayed times $t_1$, $t_3$, $t_5$. The difference in time $t_0$ and $t_1$ causes the delayed symbol S1' to bleed into the second symbol S2 received at time $t_2$. This effect of a delayed symbol bleeding into a previously received symbol is called ISI. Even though only two paths are shown in FIG. 1A, additional longer paths are possible which sometimes cause the ISI to exceed the length of an entire symbol, and therefore bleed into subsequent symbols.

Figure 1B:
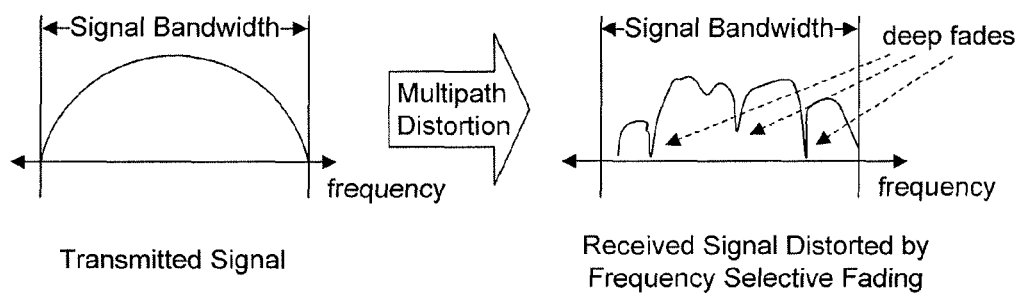
FIG. 1B illustrates distortion caused due to ISI in frequency domain.

FIG. 1B shows the distortion caused due to ISI in frequency domain. In particular, FIG. 1B shows the transmitted signal using a signal bandwidth and the received signal distorted by frequency selective fading caused due to multipath. In frequency domain, each different path length over which the transmitted signal travels will result in a specific phase shift in the transmitted signal. When the signals received via the multiple paths are combined at the receiver, some frequencies within the pass band (used bandwidth) undergo constructive interference (linear combination of in-phase signals) while some frequencies undergo destructive interference (linear combination of out-of-phase signals). The composite received signal is distorted by frequency selective fading.

In some wireless communication systems (e.g. Long Term Evolution (LTE)), a cyclic prefix (CP) is added to each symbol to preserve the orthogonality and to prevent ISI. The cyclic prefix serves as a guard interval and is discarded at the receiver. Therefore, ISI can be prevented when the delayed symbol S1' received via a longer path bleeds in the CP length of the second symbol S2 received via the direct path. This effect is illustrated in FIG. 2.

Figure 2:
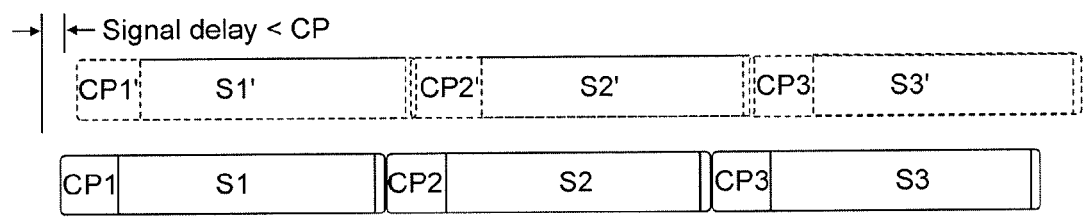
FIG. 2 illustrates the plurality of symbols of a frame prefixed with respective cyclic prefixes.

FIG. 2 shows symbols S1, S2, S3, prefixed with respective cyclic prefixes CP1, CP2, CP3, received via the direct path. FIG. 2 also shows symbols S1', S2', S3', prefixed with respective cyclic prefixes CP1', CP2', CP3', received via a longer path. As seen, when the delay introduced by the longer path is less than (or equal to) the cyclic prefix length, the ISI is avoided because the delayed symbol S1' does not bleed into the second symbol S2. Rather, the delayed symbol S1' bleeds only into the cyclic prefix CP2 which is discarded by the receiver. In this way, the data included in the symbols is received without being affected by ISI.

As such, to improve mitigation of ISI, it is desirable to have the cyclic prefix length be large. However, since the cyclic prefix is part of the symbol including data, the larger the cyclic prefix length, the greater is the undesirable reduction in data throughput. Therefore, the cyclic prefix length is chosen to balance the desirable mitigation of ISI and the undesirable reduction in throughput. The cyclic prefix lengths are fixed for given systems. For example, in LTE systems, there are two fixed cyclic prefix lengths that one can choose from. They are the standard cyclic prefix and the extended cyclic prefix. To mitigate ISI, the extended cyclic prefix may be chosen. However, even when the extended cyclic prefix is chosen, factors such as varying geographical terrain leads to ISI when the delay introduced by one of the longer paths is greater that the extended cyclic prefix length.

Accordingly, there is a need to mitigate the effects of ISI when the delay introduced by one of the longer paths is greater than the largest cyclic prefix length that is provided by a particular standard. Further, the effects of ISI affect the accuracy of the channel estimation process. In particular, the effects of ISI result in inaccurate channel estimation, which is undesirable for the following reasons.

Figure 3:
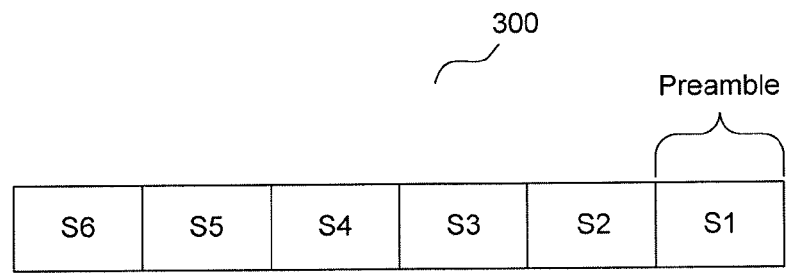
FIG. 3 illustrates a transmitted signal including a plurality of symbols.

Channel estimation is a process used to estimate the frequency and spatial response of a channel or the path between a transmitter and receiver. FIG. 3 shows an example of a transmitted signal 300 including a plurality of symbols S1-S6. The symbol S1 is considered as the preamble and includes pilot information, which is previously known to the receiver. Upon reception of the transmitted signal, the receiver compares the received pilot information to the known pilot information and derives the channel estimate based on the results of the comparison. For example, in the frequency domain, when $H_k$ is the value of a given pilot tone associated with the channel, and $X_k$ is a tone value that is transmitted, the received value $R_k$ at the receiver is given by $$R_k = H_k \times X_k \quad \text{(Equation 1)}$$

Now, the value of $X_k$ is previously known by the receiver. The receiver uses the received value $R_k$ and the known value $X_k$ to derive the value of $H_k$. $H_k$ represents a model of the frequency domain channel (e.g. as an effect of tapped delay line model in time domain), and is used to perform channel estimation. The value of $H_k$ may indicate, for example, the number of taps included in a tapped delay line model of the channel, which are used to estimate the frequency response of the channel in frequency domain. The value of $H_k$ may also indicate a time delay between the first tap and the last tap of the channel. This time delay is called the delay spread of the channel, and represents the average delay between the earliest arriving symbol and the latest arriving symbol at the receiver, as caused by channel multipath.

Now, each transmitted tone/symbol is affected by the delay spread of the channel. That is, the delay spread of the channel affects a phase of each transmitted tone/symbol. Once this delay spread of the channel is estimated for one tone/symbol, the estimation can be used to understand the effects of the delay spread on subsequently transmitted tones/symbols within a predetermined timeframe. This is because the delay spread is not expected to vary within the predetermined timeframe.

Now, as discussed above, each transmitted symbol includes a cyclic prefix to protect the data included in the symbol from the channel variance and delay spread. When the delay spread exceeds the cyclic prefix length, then a transmitted symbol bleeds into a subsequent symbol, thus causing ISI. ISI introduces errors in the channel estimation process and makes it difficult to accurately understand the effects of the delay spread on the subsequently transmitted tones/symbols.

As discussed above, ISI occurs when the delay introduced by one of the longer paths is greater than the chosen cyclic prefix length, and adversely affects the accuracy of the channel estimation process. To mitigate this adverse effect, the analytic signal including a digital signature of the present disclosure immunizes the process of channel estimation from the adverse effects of ISI. This analytic signal is transmitted from the transmitter to the receiver, which performs the channel estimation process.

Figure 4:
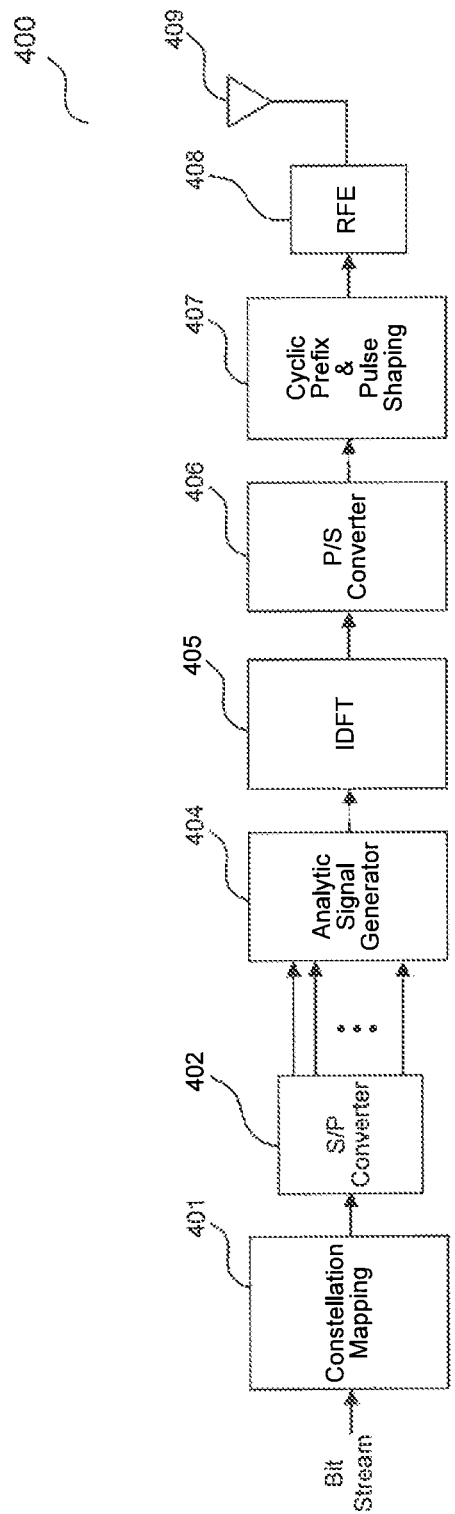
FIG. 4 illustrates an exemplary transmitter according to an embodiment of the present disclosure.

FIG. 4 shows an exemplary transmitter 400 according to an embodiment of the disclosure. The transmitter 400 includes a constellation mapping block 401, a serial/parallel converter 402, an analytic signal generator 404, an IDFT converter 405, a parallel/serial converter 406, a cyclic prefix and pulse shaping block 407, an up-converter RF Front-end (RFE) block 408, and an antenna 409.

The constellation mapping block 401 converts a bit stream to carrier symbols (e.g., BPSK, QPSK, QAM, and the like). The number of bits mapped to each symbol by mapper 401 dictates the constellation size of the digital modulation technique used. For example, if six bits from are mapped to one symbol using QAM, the QAM scheme used must have $2^6$ or 64 points/different complex symbols. The serial/parallel converter 402 converts the serial symbol data stream into multiple parallel streams of symbols for input into IDFT 405. The IDFT 405 performs, for example, an N-point I-FFT on the parallel data streams that has the effect of modulating the parallel data streams onto corresponding orthogonal sub-carriers, the output of which is combined to form a composite time domain output signal. Prior to the IDFT 405, the analytic signal generator 404 generates an analytic signal including a digital signature used to increase the effective cyclic prefix length of a pilot symbol at the output of cyclic prefix and pulse shaping block 407. At the output of the IDFT 405, the parallel/serial converter 406 converts the multiple parallel streams of symbols into serial symbol data for input to the cyclic prefix and pulse shaping block 407. The cyclic prefix and pulse shaping block 407 generates a cyclic prefix based on the input serial symbol data, and attaches the cyclic prefix to the same to output the pilot signal. Finally, an RF front-end block 408 up-converts the pilot signal to RF for transmission through the antenna 409.

In one embodiment, the analytic signal generator 404 generates the analytic signal in the frequency domain, having frequency components that when converted to the time domain by IDFT 405, result in a time domain signal with a preamble that includes a first half containing non-zero information data and a second half containing zero information data. In one embodiment, the analytic signal generator 404 receives pilot tones in the frequency domain that represent a preamble in the time domain, and implements (or calculates) a discrete Hilbert transform on the input pilot tones, the conjugate of which is then added to the input pilot tones. For example, let a number of pilots transmitted on a preamble be N, let vector B denote the vector of N elements obtained by mapping a pseudo random binary sequence (PRBS), the vector having an integer value between +1 and −1, and let $B_H$ denote the discrete Hilbert transform of vector B. In this case, the frequency domain pilot vector X transmitted with the pilots N as a preamble is given by $X=B-jB_H$. (Note: the conjugate of $jB_H$ is $-jB_H$, so effectively the conjugate is the subtraction of $jB_H$ from B) This frequency domain pilot vector X is processed using, for example, OFDM transmit signal processing. Therefore, when the analytic signal is input and processed by IDFT 405, the IDFT 405 outputs, in the time domain, a signal having a preamble that includes a digital signature having a first half containing non-zero information data and a second half containing zero information data (e.g. only "zero s" as the information data).

The analytic signal is then converted into time domain by the IDFT 405. Therefore, the output of the IDFT is a time domain signal including the preamble having a first half containing only non-zero data and a second half containing only zero data. The cyclic prefix and pulse shaping block 407 then generates a cyclic prefix based on the second half of the second preamble of the time domain signal, and attaches the cyclic prefix to the time domain signal to output a pilot signal. The generated pilot signal therefore includes a first half containing non-zero information data and a second half containing "zeroes." Now, since the second half of the pilot signal contains "zeroes," the effective cyclic prefix length associated with the pilot signal is increased. This is because the second half containing "zeroes" is used to generate the cyclic prefix, as discussed in detail later using FIGS. 6 and 7. In one embodiment, the IDFT 405 performs an inverse Fast Fourier Transform.

The above configuration of the generating the pilot signal including the second half containing "zeroes" from the analytic signal preserves the properties of the signal pertaining to the communication system, for example, the orthogonality in an OFDM communication system. Also, the effective increase in cyclic prefix length does not decrease the throughput of data because the second half containing "zeroes" overlaps a time interval gap in which no transmission and no reception is carried out. One example of such a time interval gap is the uplink-to-downlink time interval gap during which the user equipment and base station transitions from uplink transmissions to down-link transmissions. As such, the effective length of a signal, (i.e., the transmitted signal) can be made to extend beyond a conventional boundary of the same. The generated pilot signal enables the immunization of the system from very long delay spreads, and thereby enables accurate channel estimation without sacrificing data throughput.

Figure 5:
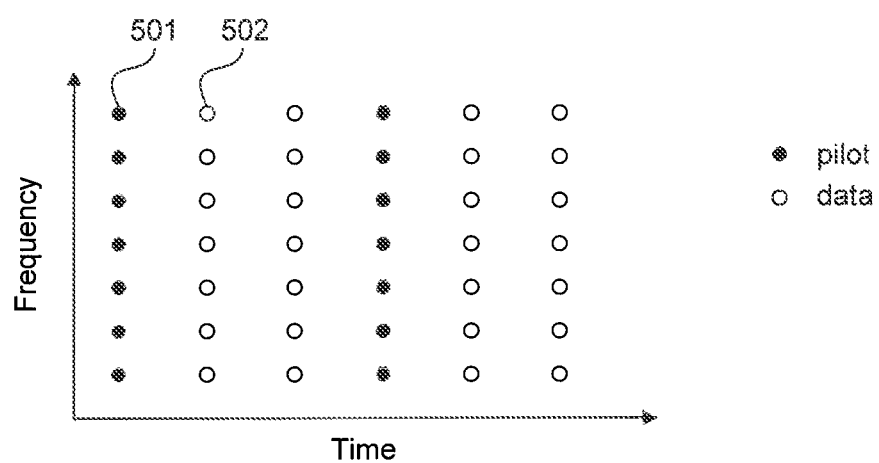
FIG. 5 illustrates pilot signals and data signals periodically transmitted by the transmitter according to an embodiment of the present disclosure.

FIG. 5 shows the pilot signals 501 and data signals 502 transmitted by the transmitter 400, where each signal may be a sub-carrier in an OFDM transmission, and each column of signals represents an OFDM symbol. In one embodiment, the transmitter 400 transmits pilot signals 501 and data signals 502 to the receiver periodically. The receiver utilizes the pilot signals 501 for channel estimation purposes, where the pilot signals 501 are periodically interspersed between the data signals 502 so that periodic corrections can be made in the receiver based on the pilot symbols 501. Also, the receiver has previous knowledge of the analytic signal used by the transmitter 400 to generate the pilot signals 501. The receiver uses this previously known analytic signal to demodulate the pilot signal that is generated based on the analytic signal. This demodulation of the pilot signal enables the channel estimation process and the decoding of the data.

Figure 6A:
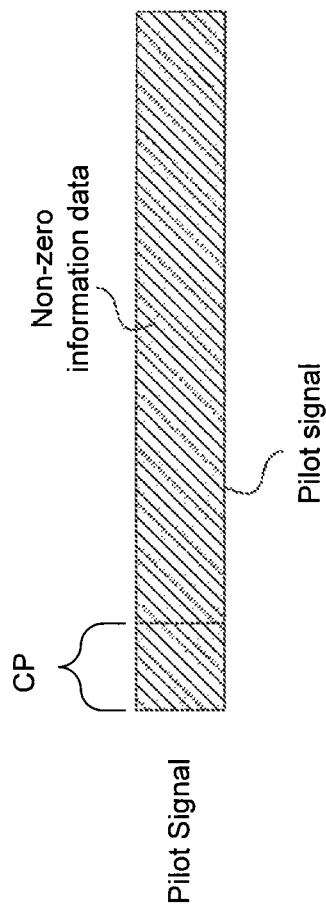
FIG. 6A illustrates a conventionally transmitted pilot signal including only non-zero data.
Figure 6B:
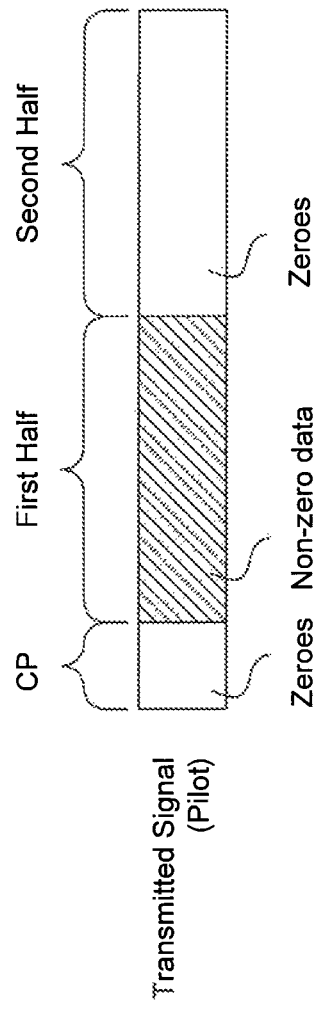
FIG. 6B illustrates the analytic signal generated by the transmitter according to an embodiment of the present disclosure.

FIG. 6A shows a conventionally transmitted pilot signal. FIG. 6B shows the transmitted signal generated based on the analytic signal and received by the receiver. The conventionally transmitted pilot signal in FIG. 6A includes only non-zero data in both its cyclic prefix and its payload portion. On the other hand, the analytic signal shown in FIG. 6B includes a second half containing zeroes, and a first half containing non-zero information data. The transmitted pilot signal includes a cyclic prefix (CP) containing "zeroes" in addition to a first half containing non-zero information data and a second half containing "zeroes." The receiver receives the transmitted pilot signal and demodulates the same to recover a recovered signal. The receiver uses this recovered signal for channel estimation, which assists in efficient decoding of subsequently transmitted information data over the same channel as the transmitted signal. As discussed below, the inclusion of zeroes in the transmitted pilot signal effectively increases the cyclic prefix length, thereby mitigating the adverse effects of ISI, which improves the accuracy of channel estimation and thereby the efficient decoding of the subsequently transmitted data. In one embodiment, the analytic signal is a Hilbert transform-based signal including a second half containing zeroes, and a first half containing non-zero information data.

Figure 7:
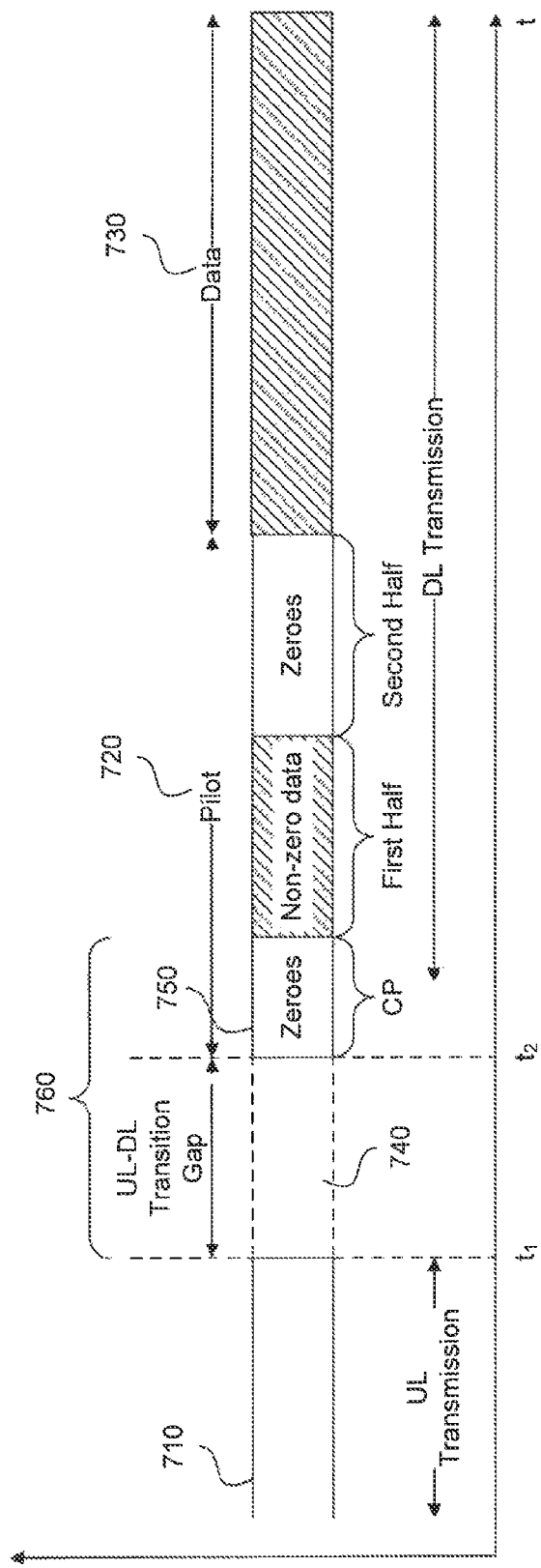
FIG. 7 illustrates the effects of using the transmitted signal for channel estimation purposes according to an embodiment of the present disclosure.

FIG. 7 shows the effects of using the above and let it signal for channel estimation purposes. FIG. 7 shows uplink transmission 710, downlink transmission including a pilot 720 and subsequent data 730, and the effective increase in cyclic prefix length in the communication system as will be shown. In one embodiment, the uplink transmission 710 and the downlink transmission 720, 730 occur at the same center frequency, the uplink and downlink transmissions being multiplexed in time. The uplink transmission is, for example, when a user equipment is transmitting to the base station, and the downlink transmission is, for example, when the base station is transmitting to the user equipment.

An uplink-to-downlink transition time interval gap 740 exists between the end of the uplink transmission time $t_1$ and the start of downlink transmission time $t_2$, and vice versa. During the uplink-to-downlink transition time interval gap 740, the user equipment (UE) transitions from transmit to receive functionality, and the base station does the same. As such, the channel is empty during the time interval gap 740, where no signal transmission occurs. Applicant's analytic signal enables the use of such an empty space in the channel to effectively increase the cyclic prefix length, and thereby avoid ISI.

In particular, the cyclic prefix 750 for the pilot signal 720 is created by using at least a portion of the second half of the pilot signal 720 that includes zeroes. This enables the cyclic prefix 750 of the transmitted signal to be detected as being the same as the empty space in the channel during which no transmission or no reception is carried out. Therefore, the communication system treats the entire duration of the time interval gap 740 and the created cyclic prefix 750 of the transmitted signal as the effective cyclic prefix length 760. That is, the effective cyclic prefix length 760 of the transmitted signal is the sum of the time interval gap 740 and the length of the created cyclic prefix 750 of the transmitted signal. Accordingly, by generating the pilot signal 720 using the analytic signal as discussed above, the effective cyclic prefix length of the transmitted signal can be increased by the entire duration of the time interval gap.

Due to the increase in the effective cyclic prefix length, the adverse effects of ISI are avoided for the pilot signal. This leads to accurate channel estimation, and therefore, to efficient decoding of the data transmitted over the channel. One of skill in the art will appreciate that any empty space in the channel can be utilized in its entirety to effectively increase the cyclic prefix length, based on the teachings provided herein.

Receiver

In communication systems using major standards like LTE (3GPP) or WiMAX (802.16e), OFDMA technology is used. In these systems, as discussed above, inter-symbol interference (ISI) is a major cause of performance degradation. Also, as discussed above, a cyclic prefix (CP) is used for every OFDMA symbol during transmission to efficiently mitigate ISI at the receiver. For the system to have negligible ISI, CP length should be greater than the channel delay spread (or channel Multipath propagation delay).

Now, for a cellular deployment having a small cell radius, channel delay spread (or Multipath propagation delay) is expected to be small, and for a cell having a large radius, the channel delay spread is expected to be large. In a given network, the CP length used for OFDMA transmission can be decided by the service provider depending on network deployment. A base station (e.g., WiMAX, LTE, etc.) can transmit downlink signals having different CP lengths depending on the network deployment strategy used in the geographical area where the base station is located.

In some wireless systems (e.g., LTE and/or 3GPP), during initial synchronization, user equipment (UE) need not know the CP length used by the base station. However, in these wireless systems, the UE is then required to perform a rigorous search during the initial synchronization procedure to find the actual CP length used by the base station. The CP length used could be one of the fixed CP lengths prescribed by the wireless standard. For example, in LTE systems, the base station may use normal CP length or extended CP length. The knowledge of the used CP length is a vital parameter required to complete the process of the synchronization for the following reasons. The CP length parameter is required to compute the start of the slot, and hence the start of sub frame and radio frame during initial synchronization and cell search procedures. Further, the number of OFDM samples between primary synchronization signal (PSS) symbols and secondary synchronization signal (SSS) symbols is also decided by the CP length used by the base station. PSS symbols and SSS symbols are used for synchronization and cell search procedures in the wireless system. Finally, the CP length parameter is used in initializing a pseudo random sequence generator for cell specific reference signal generation in the wireless system.

When the UE is not aware of the CP length used by the base station, the initial synchronization procedure and the cell search procedure will take about twice as long on average as compared to when the used CP length is known to the UE. This leads to additional delays in searching for Cell Identification parameters (NID1, NID2) of the base station that are required to establish communication with the base station. The above factor of taking twice as long is based on the fact that UE will need to perform a blind search assuming one of the various possible CP lengths. Therefore, there is a need to reduce the amount of time associated with searching for the Cell Identification parameters (NID1, NID2) by reducing the amount of time required to complete the synchronization and cell search procedures.

To this end, the present disclosure discloses the transform domain (DFT) based method to detect the CP length being used by the base station. Further, using the transform domain method as described below significantly improves performance even in very low carrier to noise plus interference ratio (CINR) conditions. Finally, the disclosed transform domain based method has the following advantages over the conventional CP correlation based method. Any interfering signal with the same or a different CP length having a timing offset between slot timings will not affect the performance of the DFT method because the DFT method does not simply depend on CP correlation peak distances, as conventional methods do. In the case of two base stations using the same CP length and timing offset between the start time of slots interfering with each other, when using the DFT method, the CP length detection metric (discussed below) will get improved by coherently adding up all the same CP length signal metrics in the transform domain. Conversely, traditional methods simply find the peaks using CP correlation and get confused with the peaks that are separated with non-integer multiple of number of OFDM samples.

By detecting the CP length parameter before starting the search for NID1 and NID2 Cell Identification parameters, reduction in the average search time for synchronization or cell search can be achieved. This is done by reducing the total number of parameter combinations (TDD/FDD and CP lengths) to half of all the possible combinations, and by detecting the most likely CP length parameter of the strongest base station using the DFT method. Further, improvement in the accuracy of the fractional frequency offset (FFO), which is very important parameter in the process of correcting the frequency offset impairment of the receiver, can be achieved by using the DFT method. Finally, the DFT method can be adaptively used for systems having an unknown CP length parameter.

Figure 8:
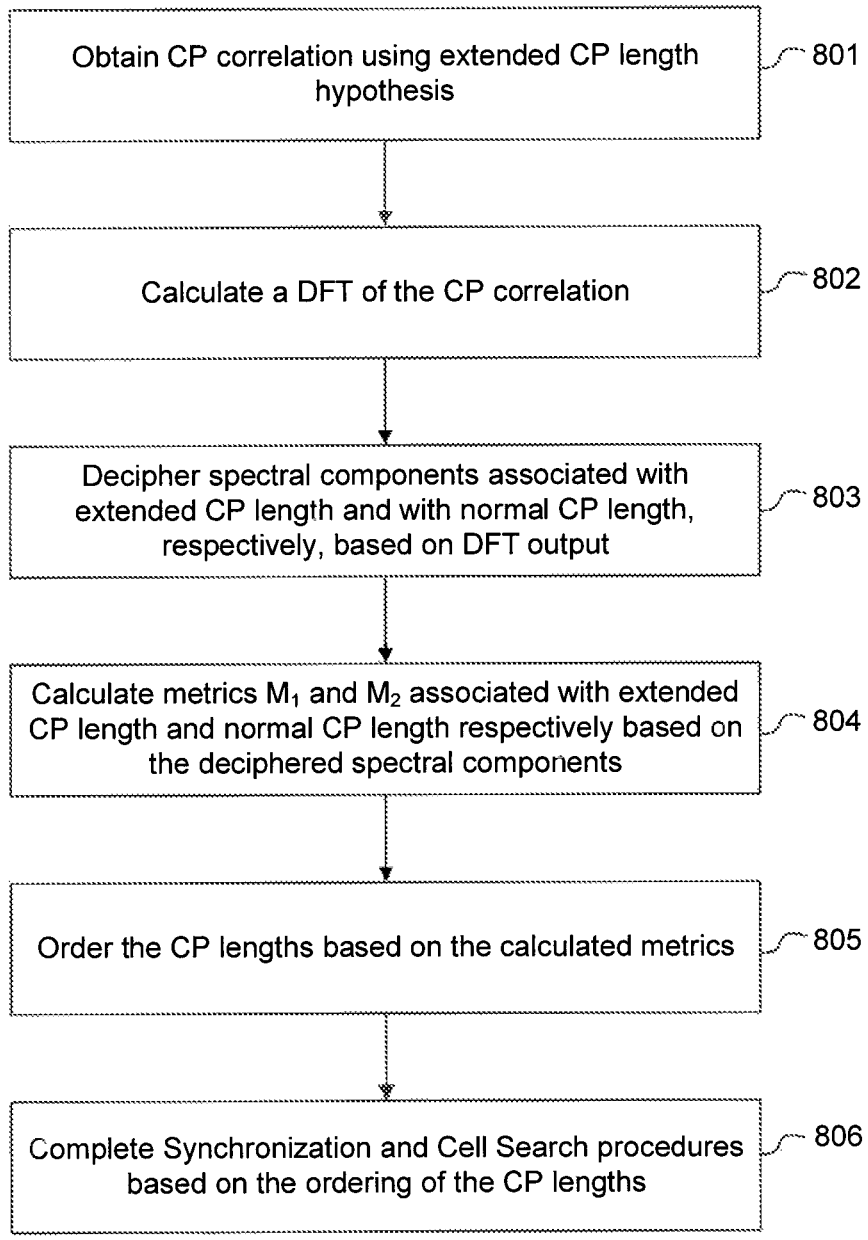
FIG. 8 illustrates the DFT method according to an embodiment of the present disclosure.

FIG. 8 illustrates the DFT method which will now be described in detail. The DFT method to detect the CP length is based on periodogram of CP correlation, and eliminates the possibilities of CP lengths which are not required to be evaluated. In the exemplary embodiment described below, the wireless system is assumed to have two fixed CP lengths, normal CP length and extended CP length. However, one of ordinary skill in the art will appreciate that the DFT method can be applied in a wireless system having more than two fixed CP lengths.

In step 801, the DFT method starts by performing or obtaining a CP correlation using the extended CP length hypothesis. That is, the process starts by assuming that the CP length used by the base station is the extended CP length. In step 802, the obtained CP correlation is converted in frequency domain by calculating a DFT of the same. In step 803, the receiver deciphers the spectral components (included in the received signal) associated with the extended CP length and with the normal CP length respectively. The deciphering of the spectral components is performed based on Applicant's recognition that the distinctions between the spectral components associated with the extended CP length and the spectral components associated with the normal CP length are easily deciphered in frequency domain. In step 804, the receiver calculates separate metrics ($M_1$ and $M_2$) associated with the extended CP length and with the normal CP length, respectively, based on the deciphered distinctions between the above spectral components. In step 805, the receiver orders the CP lengths during the initial synchronization procedure and the cell search procedure based on the calculated metrics. Finally, in step 806, the receiver completes the initial synchronization procedure and the cell search procedure based on the ordering of the CP lengths. The processing associated with each of the above steps is detailed below.

In step 801, it is assumed that the OFDM sampling rate is $f_S$. Let $x_a(n)$ denote the time domain receive signal at the $a^{th}$ antenna, where n is the sample index. For each antenna, the correlation of a length $N_{CP}$ portion of the receive signal with a version shifted by the FFT length $N_{FFT}$ is calculated to yield the complex valued CP correlation statistic $\rho(n)$ as follows:

$$\text{Define } r(k) \text{ as} \qquad \text{(Equation 2)}$$

$$r(n) = \sum_{a=1}^{2} conj(x_a(n))x_a(n + N_{FFT})$$

$$\rho(n) = \sum_{i=0}^{N_{CP}-1} \sum_{a=1}^{2} x_a^*(n+i) \qquad \text{(Equation 3)}$$

$$x_a(n+i+N_{FFT}), \quad n = 0, \ldots, N_{Slot} - 1$$

$$= \sum_{i=0}^{N_{CP}-1} r(n+i)$$

where $N_{Slot}$ denotes the slot duration. For example, $N_{Slot} = f_S \cdot T_{Slot}$ where $T_{Slot} = 0.5$ m sec. The present example uses $f_s$ of 1.92 MHz for a minimum bandwidth available in, for example, a 3GPP based LTE system. The correlator can be efficiently implemented as a running sum $$\rho(n) = \rho(n-1) + r(n+N_{CP}) - r(n-1) \qquad \text{(Equation 4)}$$

To further increase the quality (i.e. to get better processing gain and improved noise immunity) of the statistics, a $\rho(n)$ over L slots is calculated. Assuming that $\rho_l(n)$ denotes the statistics obtained from the $l^{th}$ slot, we arrive at the final statistics $$\bar{\rho}(n) = \sum_{l=0}^{L-1} \rho_l(n) \qquad \text{(Equation 5)}$$

This last summation is motivated by the fact that the symbol structure in the time domain is periodic with the slot period.

The DFT method operates on the CP correlation obtained with a wrap around average of a slot duration. In a system with minimum OFDM sampling rate, the number of samples per slot is 960. At this sampling rate, the possible CP lengths (extended and normal) in number of OFDM samples are 9 (10 for first symbol in every slot) and 32 respectively.

Irrespective of CP length, the received signal in terms of slot is periodic with slot duration. In this method of CP length detection, CP correlation obtained with extended CP hypothesis is used. CP correlation obtained with extended CP length hypothesis, contains peaks/patterns and spectral components corresponding to both normal and extended CP lengths.

In step 802, let the CP correlation that is averaged over multiple radio frames over a wrap around length of one slot (960 samples at synchronization signal bandwidth with sampling frequency of 1.92 MHz) be denoted as $\bar{\rho}(n)$ for n=0 ... ($N_{slot}$-1). Let the $N_{slot}$-DFT of the sequence $\bar{\rho}(n)$ be denoted as G(k) representing the discrete frequency components from 0 to $2\pi$. In that case, $$\{G_k\}_{k=0}^{N_{slot}-1} = DFT_{N_{slot}}\{\rho(n)\}_{n=0}^{N_{slot}-1} \quad \text{(Equation 6)}$$

In step 803, let the periodicities expected in the CP correlation be $P_1$ and $P_2$ corresponding to extended and normal CP lengths respectively (e.g., with extended CP length and normal CP length, number of peaks expected in CP correlation of one slot duration is 6 and 7 respectively). Let the signal component be defined as sum of magnitude of $G_k$ on the integer multiple bins of the harmonic of interest. Noise component is defined as the bins that do not correspond to any periodicity of interest in the system. In finding the signal and noise components, we exclude all the bins that correspond to both the CP lengths. This will avoid the detection of wrong CP length because of interference. Signal bins ($S_{bins}$), Noise bins ($Q_{bins}$) and the bins to be excluded in the computations are given below.

$$S_{bins} = \{P_1, 2P_1, 3P_1, \ldots\} \quad \text{(Equation 7)}$$

where largest value in $S_{bins}$ is smaller than $N_{strongbins}$. $N_{strongbins}$ denotes the number above which frequency, magnitude of frequency components is negligible. Let small set of noise bins be denoted as $Q_{small} = \{1,2,3,4,5\}$, then Noise bins $Q_{bins}$ defined as below $$Q_{bins} = \{1*\{Q_{small}\}, P_1+\{Q_{small}\}, 2P_1+\{Q_{small}\}, \ldots\} \quad \text{(Equation 8)}$$

where largest value in $Q_{bins}$ is smaller than $N_{strongbins}$. Bins to be excluded for the periodicity $P_1$ are all the $P_2$ components (for the metric corresponding to periodicity $P_2$, all the $P_1$ components shall be removed). Exclude bins are defined as $X_{bins}$ $$X_{bins} = \{P_2, 2P_2, 3P_2, \ldots\} \quad \text{(Equation 9)}$$

where largest value in $X_{bins}$ is smaller than $N_{strongbins}$. Then for finding signal and noise components, a new set of Noise and Signal bins without $X_{bins}$ is found.

$$S_{bins} = S_{bins} \hat{-} X_{bins}$$

$$Q_{bins} = Q_{bins} \hat{-} X_{bins} \quad \text{(Equation 10)}$$

Where $\hat{-}$ denotes a set difference between the two sets of bins. All the negative frequency components corresponding to signal and noise are appended to $S_{bins}$, $Q_{bins}$ to make a complete list of all the frequency components for making the decision.

$$S_{binsFull} = \{\{S_{bins}\}, 961-S_{bins}\}$$

$$Q_{binsFull} = \{\{Q_{bins}\}, 961-Q_{bins}\} \quad \text{(Equation 11)}$$

In step 804, the metric for CP length detection with periodicity of $P_1$ is denoted as $M_1$ and given by $$M_1 = \frac{\frac{1}{|S_{binsFull}|} \sum_{k \in S_{binsFull}} abs(G_k)}{\frac{1}{|Q_{binsFull}|} \sum_{k \in Q_{binsFull}} abs(G_k)} \quad \text{(Equation 12)}$$

Where $|S_{binsFull}|$ and $|Q_{binsFull}|$ represent the respective cardinalities of the arguments set in equation 11. Similar to equation 12, the metric ($M_2$) for periodicity $P_2$ is also obtained by repeating the calculations shown in the above equations.

In this way, after performing the CP correlation using the extended CP length hypothesis, separate metrics ($M_1$ and $M_2$) associated with the extended CP length and with the normal CP length respectively are calculated. The calculation of the metrics ($M_1$ and $M_2$) includes calculating a DFT of the received signal, and deciphering spectral components (included in the received signal) associated with the extended CP length and with the normal CP length respectively. The deciphering of the spectral components is done based on Applicant's recognition that the distinctions between the spectral components associated with the extended CP length and the spectral components associated with the normal CP length are easily deciphered in frequency domain. These distinctions are used to calculate the separate metrics ($M_1$ and $M_2$).

In step 805, the orders are set based on the values of the calculated metrics with respect to a threshold. In step 806, the receiver completes the initial synchronization procedure and the cell search procedure based on the ordering of the CP lengths. The setting of the order and completing the initial synchronization procedure and the cell search procedure based on the ordering of the CP lengths significantly reduces the time required by the UE to identify the CP length associated with the communicating base station before completing the synchronization process. The UE is then able to search the Cell Identification parameters (NID1, NID2) associated with the base station sooner due to the reduction in time in identifying the CP length.

Figure 9:
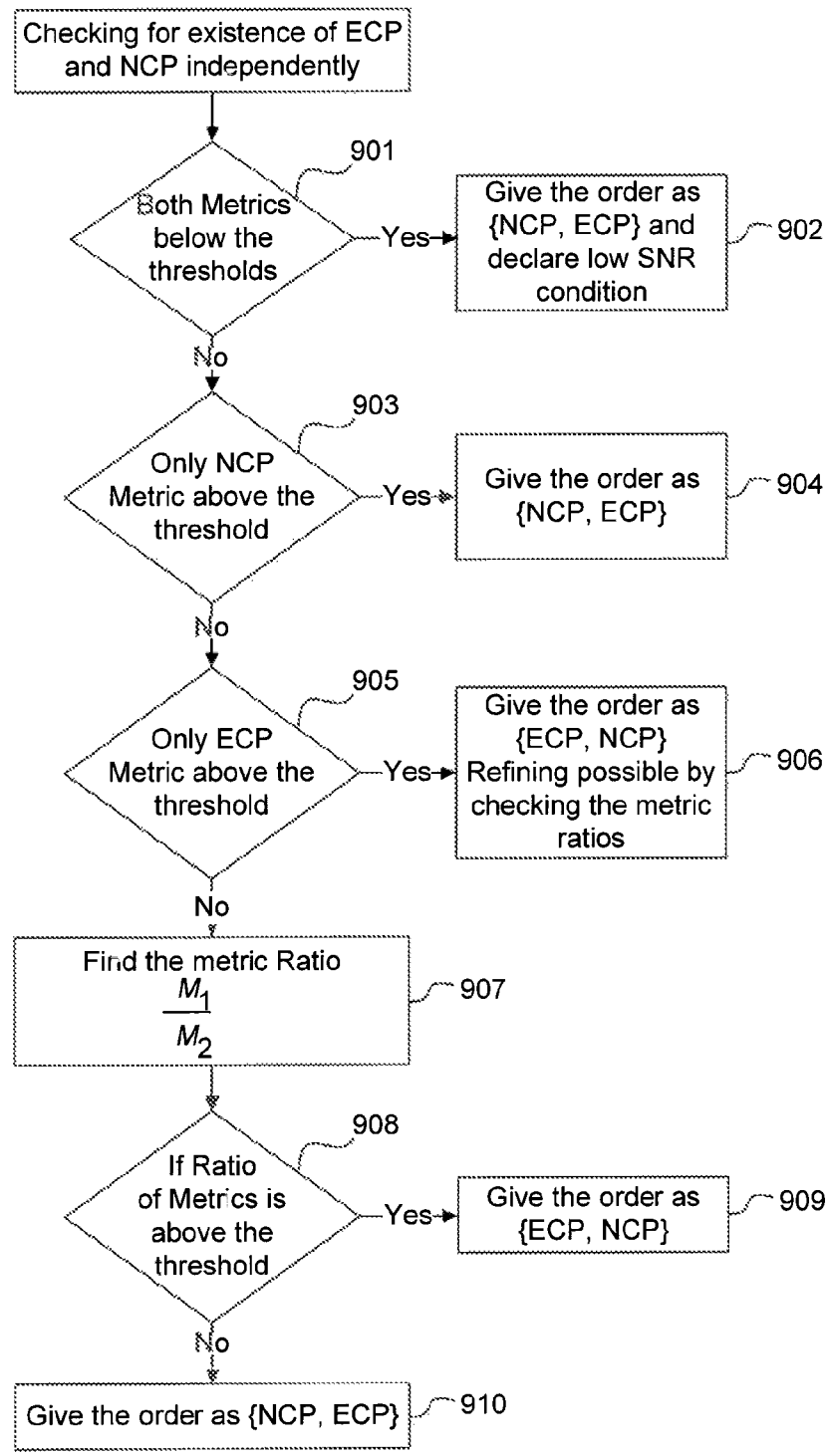
FIG. 9 illustrates the method of ordering the CP lengths according to an embodiment of the present disclosure.

FIG. 9 illustrates the method of ordering the CP lengths based on their strengths in the received signal instead of ruling out the possibility of existence of that CP length in very low CINR conditions. The process of ordering begins with checking for the existence of extended CP length and/or the normal CP length independently by using the calculated metrics ($M_1$, $M_2$). When a metric ($M_1$, $M_2$) is found to be above a threshold, then the CP with corresponding periodicity of peaks is declared to be present in the network and ordered appropriately. In case a particular CP length is not found in the signal captured, that CP length is ordered lower in the priority list of CP lengths, as shown in the flow chart illustrated in FIG. 9.

In particular, in step 901, both metrics (M1, M2) are compared to a given threshold. If both metrics are found to be below the given threshold, then the process moves to step 902. In step 902, the order is set as normal extended CP and then extended CP. Also, a low signal to noise ratio condition is declared. However, in step 901, if both metrics are not found to be below the given threshold, then the process moves to step 903.

In step 903, it is checked whether only the metric ($M_2$) associated with the normal CP length is above the threshold. If the answer is "yes," then the process moves to step 904. In step 904, the order is set as normal CP and then extended CP (without any declaration related to SNR). However, in step 903, if the answer is "no," then the process moves to step 905.

In step 905, it is checked whether only the metric ($M_1$) associated with the extended CP is above the given threshold. If the answer is "yes," then the process moves to step 906. In step 906, the order is set as extended CP and then normal CP. Also, the system recognizes the possibility of refining system parameters based on a ratio of the metrics ($M_1$ and $M_2$). However, in step 905, if the answer is "no," then the process moves to step 907.

In step 907, a ratio of the metrics ($M_1/M_2$) is calculated, and the process moves to step 908. In step 908, it is checked whether the ratio of the metrics ($M_1/M_2$) is greater than the given threshold. If the answer is "yes," then the process moves to step 909. In step 909, the order is set as extended CP and then normal CP. However, in step 908, if the answer is "no," then the process moves to step 910. In step 910, the order is set as normal CP and then extended CP.

Figure 10:
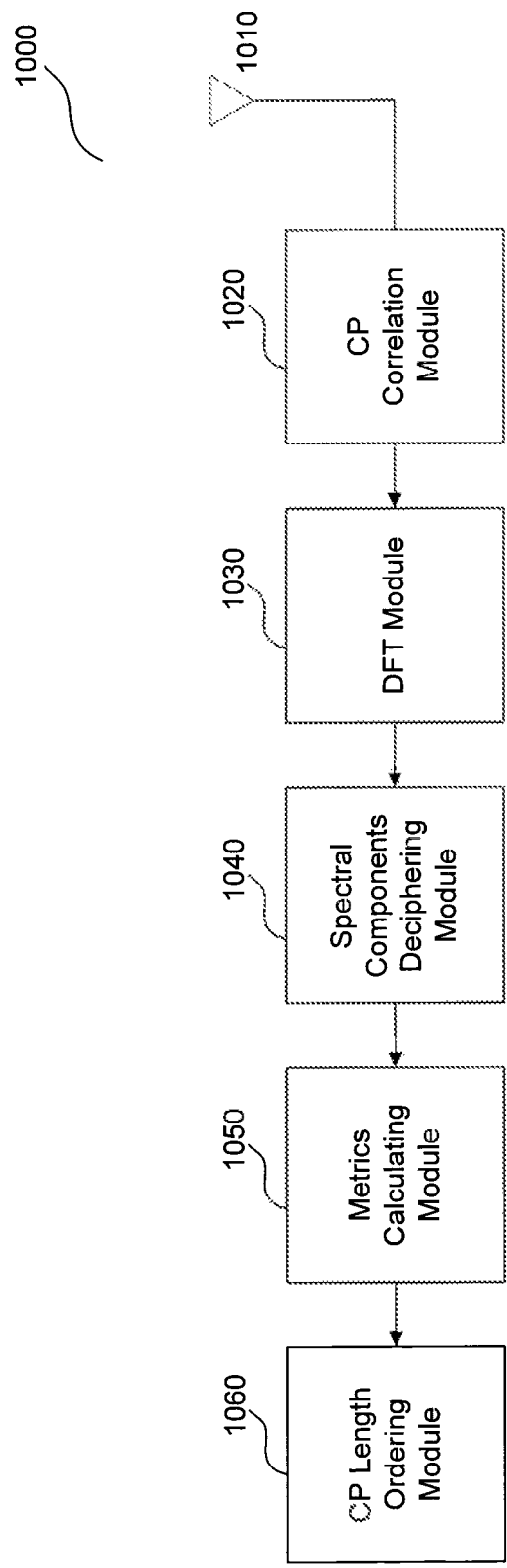
FIG. 10 illustrates an exemplary receiver that performs the DFT method according to an embodiment of the present disclosure.

FIG. 10 illustrates a receiver that performs the methods shown in FIGS. 8 and 9. The receiver 1000 includes an antenna 1010, a CP correlation module 1020, a DFT module 1030, a spectral components deciphering module 1040, a metrics calculating module 1050, and a CP length ordering module 1060. The antenna 1010 receives the signal from a base station (not shown). The CP correlation module 1020 performs the CP correlation using the extended CP length hypothesis, as described in step 801. The DFT module 1030 calculates a DFT of the obtained CP correlation to operate in frequency domain, as described in step 802. The spectral components deciphering module 1040 deciphers the distinctions between spectral components associated with extended CP length and spectral components associated with normal CP length, as described in step 803. The metrics calculation module calculates separate metrics ($M_1$, $M_2$) associated with extended CP length and with normal CP length, respectively, based on the deciphered spectral components, as described in step 804. Finally, the CP length ordering module 1060 orders the CP lengths, as described in step 805 and as illustrated in FIG. 9. Based on this ordering of the CP lengths, the receiver completes the initial synchronization procedure and the cell search procedure.

Receiver—CP Length Confirmation

As discussed above, the user equipment (UE) performs the DFT method to detect the CP length being used by a base station. The detected CP length is then used to reduce the amount of time required to complete the synchronization and cell search procedures. In particular, the UE uses the detected CP length information to obtain Cell Identification parameters (NID1, NID2) along with information including a Maximum energy Tap location and a reference signal receive power (RSRP) while completing the synchronization and cell search procedures. Therefore, there is a need to confirm that the detected CP length is accurate to ensure proper completion of the synchronization and cell search procedures. Further, once the UE has obtained the registration parameters (NID1, NID2) along with the above information, the UE proceeds to enter the network. However, the UE's entry into the network fails if the detected CP length is inaccurate. Therefore, there is additional need to confirm that the detected CP length is accurate.

To avoid the above issues, a CP length confirmation method is provided to confirm the accuracy of the detected CP length. This confirmation method is described below.

In one embodiment, the method includes reusing parameters obtained during the synchronization process to confirm the detected CP length, for example the parameters including one or more of: the registration parameters, Maximum energy Tap location, and RSRP information. In particular, as discussed below, the method includes calculating frame start times (FST) and parameter associated with the different CP lengths and comparing the calculated parameters for each of the CP lengths among each other to confirm the detected CP length. The FST is associated with a given CP length, and indicates an arrival time associated with the next subframe from the base station, the subframe having the given CP length, which can the obtained based on the information acquired during synchronization process.

Figure 11:
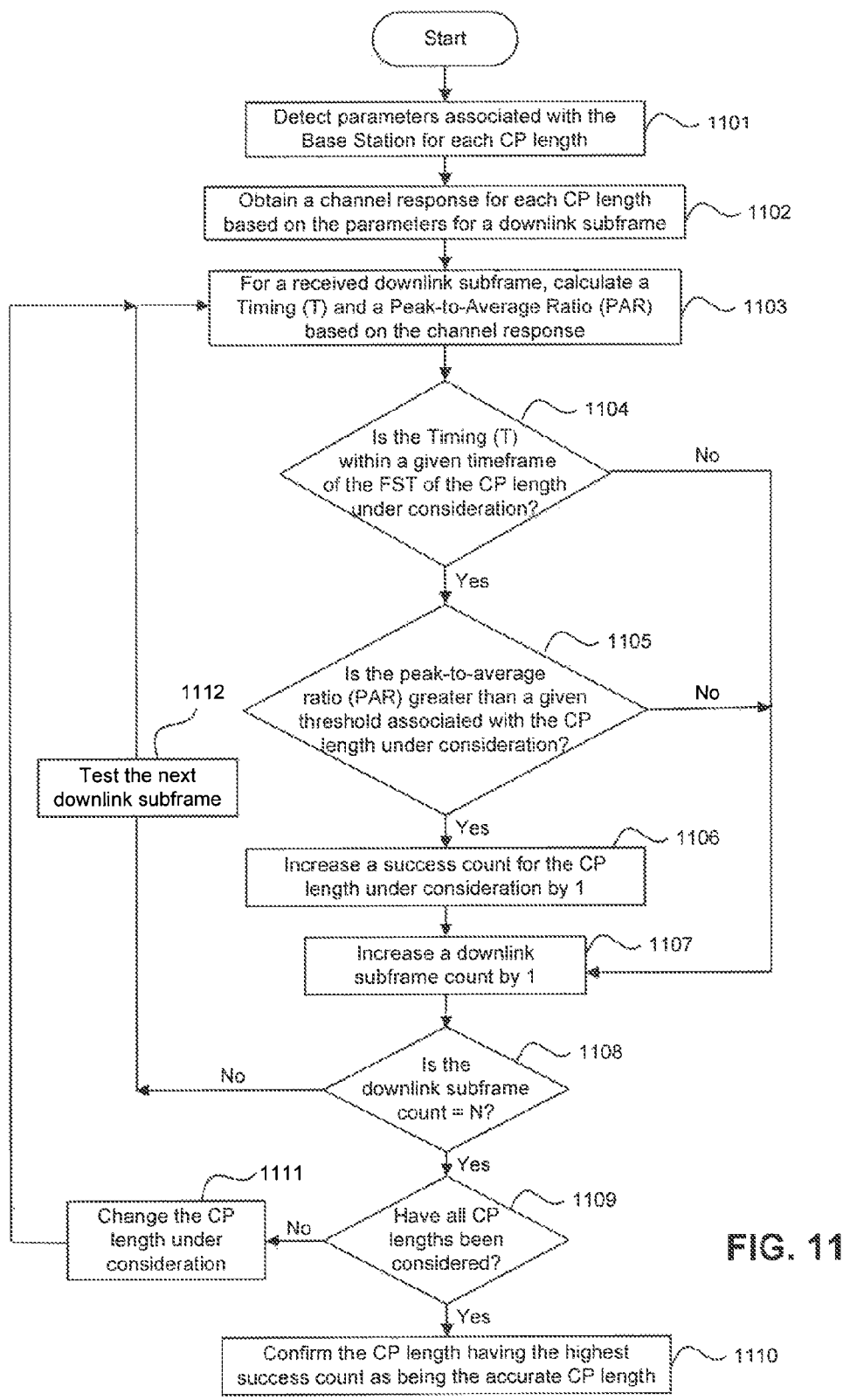
FIG. 11 illustrates an exemplary confirmation method according to an embodiment of the present disclosure.

FIG. 11 illustrates the confirmation method according to an embodiment of the present disclosure. Upon starting, in step 1101, the UE detects parameters associated with the base station for each possible CP length. These parameters may be detected from the transmissions (downlink subframes) from the base station and/or calculated by the UE. For example, the UE calculates a frame start time (FST) for each possible CP length based on information acquired during synchronization phase. The FST is an arrival time of the next downlink subframe having the respective CP length. For example, in a system having two possible CP lengths, namely a normal CP length (NCP) and an extended CP length (ECP), the UE calculates two respective FSTs, namely $FST_{NCP}$ and $FST_{ECP}$. Further, the UE may detect parameters and information included in cell-specific reference signals associated with the downlink subframes having the respective FSTs. The UE may also detect pilot information included in pilot symbols of the subframes to calculate the parameters.

In step 1102, the UE obtains a channel impulse response (CIR) of the channel over which the downlink subframes having the different CP lengths are received. For example, in a system having two possible CP lengths, namely a normal CP length (NCP) and an extended CP length (ECP), the UE obtains two channel impulse responses, namely $CIR_{NCP}$ and $CIR_{ECP}$. The UE may obtain the channel impulse responses (CIRs) based on the information included in the cell-specific reference signals and the pilot information from the base station.

In step 1103, the UE calculates/estimates a timing (T) and a peak-to-average ratio (PAR) associated with the channel over which a downlink subframe is received. The timing (T) can be calculated based on a measurement of a maximum energy sample from the channel impulse response (CIR). The peak-to-average ratio (PAR) may be calculated by taking a ratio of the maximum energy sample with respect to a total energy sample of the channel impulse response (CIR).

In step 1104, the UE picks a CP length from the possible CP lengths for consideration. Further, the UE checks whether the calculated timing (T) is within a given time duration of the FST calculated for the CP length under consideration. In one embodiment, the given time duration is 0-10 micro-seconds before and/or after the FST. For example, when the UE picks a normal CP length for consideration from among the normal CP length and an extended CP length, the UE checks whether the timing (T) is within the given time duration of $FST_{NCP}$. If the answer is "Yes," then the process moves to step 1105 or to step 1106. That is, step 1105 is optional. However, if the answer is "No," then the process moves to step 1107. In step 1105, the UE checks whether the calculated PAR is greater than a given threshold associated with the CP length under consideration. That is, when the normal CP length is under consideration, the UE checks whether the calculated PAR is greater than a threshold ($\Delta_{NCP}$) associated with the normal CP length. If the answer is "Yes," then the process moves to step 1106, and if the answer is "No," the process moves to step 1107.

In step 1106, the UE increments a counter that keeps a success count for the CP under consideration. In particular, when a downlink subframe having the CP length that is under consideration is received, the UE performs steps 1104 and 1105, and when the answers to questions in steps 1104 and 1105 are "Yes," the UE counts such an event as a success. The success count for a given CP length under consideration indicates the likelihood that the CP length under consideration is the accurate CP length. Therefore, when the calculated timing (T) and the calculated peak-to-average ratio (PAR) satisfy certain conditions associated with the CP length under consideration, then the likelihood of the CP length under consideration being the accurate CP length increases. The process then moves to step 1107.

In step 1107, the UE increases the count of the number of downlink subframes tested, and the process moves to step 1108. In step 1108, the UE checks whether the number of downlink subframes tested for the CP under consideration is equal to a predetermined integer "N." That is, for a given CP length under consideration, the UE performs steps 1103-1107 for "N" integer number of downlink frames, which have the given CP length under consideration and are received from the base station. In one embodiment, "N" integer number of consecutive downlink subframes having the CP length under consideration are tested. If the answer to the question in step 1108 is "Yes," then the process moves to step 1109, and if the answer is "No," then the process moves to step 1112. In step 1112, the UE gets ready to test the next downlink subframe having the CP length under consideration. The process then moves to step 1103.

In step 1109, the UE verifies that all possible CP lengths have been considered. If the answer to the question in step 1109 is "Yes," then the process moves to step 1110, and if the answer is "No," then the process moves to step 1111. In step 1111, the UE changes the CP length under consideration, and the process moves to step 1103. Now, if the answer is "Yes," then the UE understands that all the possible CP lengths have been considered. In step 1110, the UE compares the respective success counts associated with each possible CP length. For example, in a system having two possible CP lengths, namely a normal CP length (NCP) and an extended CP length (ECP), the UE compares the success count ($SC_{NCP}$) associated with the normal CP length with the success court ($SC_{ECP}$) associated with the extended CP length. The UE then confirms the CP length having the highest success count as the accurate CP length based on the results of the comparison. The process then ends.

An advantage of the above inventive confirmation method to confirm a CP length as being accurate is that the method performs well even in low signal-to-noise ratio and highly frequency selective channels.

Figure 12:
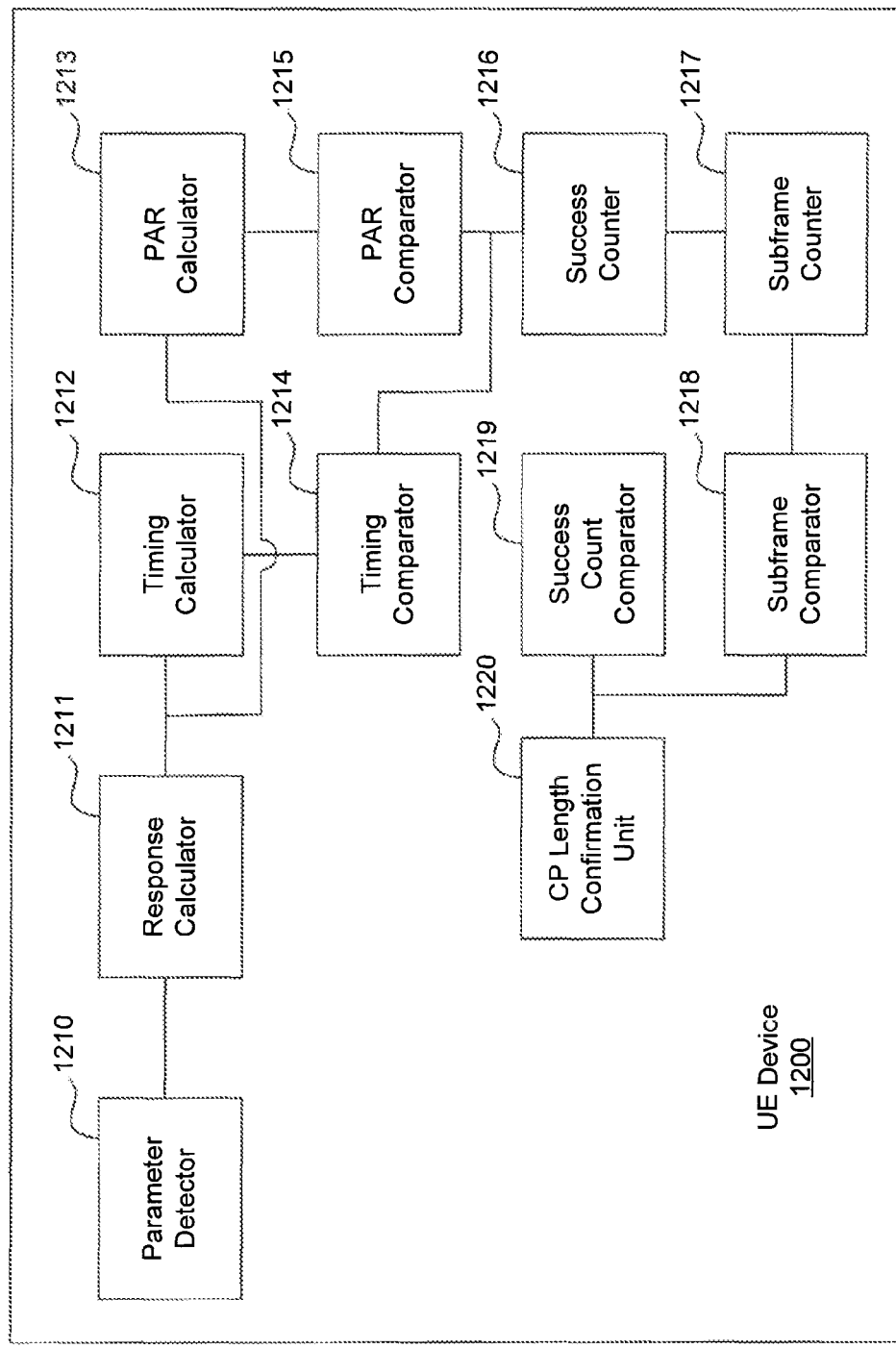
FIG. 12 illustrates the structural block diagram of an exemplary user equipment device that performs the confirmation method according to an embodiment of the present disclosure.

FIG. 12 illustrates the structural block diagram of the UE device that performs the method illustrated in FIG. 11. The UE device 1200 includes a parameter detector 1210, a response calculator 1211, a timing calculator 1212, a PAR calculator 1213, a timing comparator 1214, a PAR comparator 1215, a success counter 1216, a subframe counter 1217, a subframe comparator 1218, a success count comparator 1219, and a CP length confirmation unit 1220. The parameter detector detects parameters associated with the base station, as discussed above with respect to step 1101. The response calculator 1211 calculates a channel impulse response of the channel over which the downlink subframes having the different CP lengths are transferred, as discussed above with respect to step 1102. The timing calculator 1212 and the PAR calculator 1213 respectively calculate a timing (T) and the PAR associated with the channel, as discussed above with respect to step 1103. The timing comparator 1214 picks a CP length from among the possible CP lengths, and checks whether the calculated timing (T) is within a given timeframe of the FST calculated for the CP length under consideration, as discussed above with respect to step 1104. The PAR comparator 1215 checks whether the calculated PAR is greater than a given threshold associated with the CP length under consideration, as discussed above with respect to step 1105.

The success counter 1216 increments a success count for the CP length under consideration based on results of the checks performed by the timing comparator 1214 and the PAR comparator 1215, as discussed above with respect to step 1106. The subframe counter 1217 increments a count of the number of downlink frames tested, as discussed above with respect to step 1107. The subframe comparator 1218 checks whether the number of downlink subframes tested is equal to a predetermined integer "N," as discussed above with respect to step 1108. The CP length confirmation unit 1220 checks whether all possible CP lengths have been considered, and if not then the CP length confirmation unit 1220 changes the CP length under consideration. Finally, once all the CP lengths have been considered, the CP length confirmation unit 1220 confirms a CP length as being the accurate one based on the highest success count, as discussed above with respect to step 1110. The success count comparator 1219 determines the highest success count based on a comparison of the success counts associated with each CP length, as discussed above with respect to step 1110.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software. For example, at least portions of the transmitter 400, receiver 1000, and user equipment 1200 can implemented with one or more general purpose or special-purpose processors, or as a combination of hardware and software.

Figure 13:
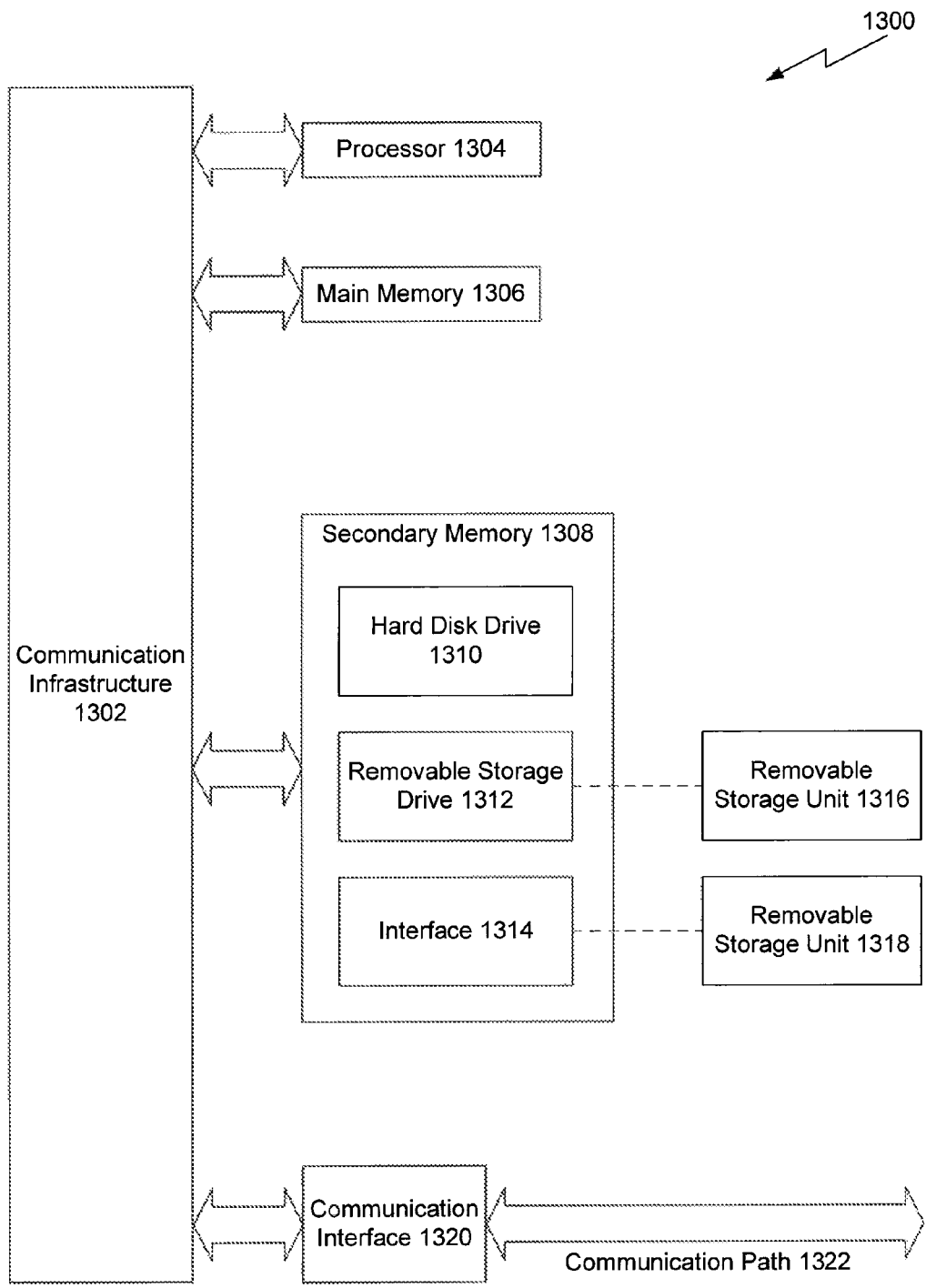
FIG. 13 illustrates an example computer system that can be used to implement aspects of the present disclosure, the aspects including all features of the transmitter of FIG. 4, all features of the receiver of FIG. 10, all features of the user equipment of FIG. 12, and all features of the algorithms illustrated in FIGS. 8, 9, and 11.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 1300 is shown in FIG. 13. All of the features depicted in FIGS. 1-12 (e.g., transmitter 400 and components thereof, receiver 1000 and components thereof, algorithms in FIGS. 8, 9, and 11, user equipment 1200 and components thereof, etc.) can execute on one or more distinct computer systems 1300. Furthermore, any functions performed by any of the above features can be implemented on one or more distinct computer systems 1300.

A computer system 1300 includes one or more processors, such as processor 1304. Processor 1304 can be a special purpose or a general purpose digital signal processor. Processor 1304 is connected to a communication infrastructure 1302 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1300 also includes a main memory 1306, preferably random access memory (RAM), and may also include a secondary memory 1308. Secondary memory 1308 may include, for example, a hard disk drive 1310 and/or a removable storage drive 1312, representing a floppy disk drive, a magnetic tape drive, an optical disk drive, or the like. Removable storage drive 1312 reads from and/or writes to a removable storage unit 416 in a well-known manner. Removable storage unit 1316 represents a floppy disk, magnetic tape, optical disk, or the like, which is read by and written to by removable storage drive 1312. As will be appreciated by persons skilled in the relevant art(s), removable storage unit 1316 includes a computer usable storage medium having stored therein computer software and/or data.

In alternative implementations, secondary memory 1308 may include other similar means for allowing computer programs or other instructions to be loaded into computer system 1300. Such means may include, for example, a removable storage unit 1318 and an interface 1314. Examples of such means may include a program cartridge and cartridge interface (such as that found in video game devices), a removable memory chip (such as an EPROM, or PROM) and associated socket, a thumb drive and USB port, and other removable storage units 1318 and interfaces 1314 which allow software and data to be transferred from removable storage unit 1318 to computer system 1300.

Computer system 1300 may also include a communications interface 1320. Communications interface 1320 allows software and data to be transferred between computer system 1300 and external devices. Examples of communications interface 1320 may include a modem, a network interface (such as an Ethernet card), a communications port, a PCMCIA slot and card, etc. Software and data transferred via communications interface 1320 are in the form of signals which may be electronic, electromagnetic, optical, or other signals capable of being received by the host device 100. These signals are provided to communications interface 1320 via a communications path 1322. Communications path 1322 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1316 and 1318 or a hard disk installed in hard disk drive 1310. These computer program products are means for providing software to computer system 1300.

Computer programs (also called computer control logic) are stored in main memory 1306 and/or secondary memory 1308. Computer programs may also be received via communications interface 1320. Such computer programs, when executed, enable the computer system 1300 to implement the present disclosure as discussed herein. In particular, the computer programs, when executed, enable processor 1304 to implement the processes of the present disclosure, such as any of the methods described herein. Accordingly, such computer programs represent controllers of the computer system 1300. Where the disclosure is implemented using software, the software may be stored in a computer program product and loaded into computer system 1300 using a removable storage drive 1312, interface 1314, or communications interface 1320.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It should be noted that any exemplary processes described herein can be implemented in hardware, software, or any combination thereof. For instance, the exemplary process can be implemented using computer processors, computer logic, application specific circuits (ASICs), digital signal processors (DSP), etc., as will be understood by one of ordinary skill in the arts based on the discussion herein.

Moreover, any exemplary processes discussed herein can be embodied by a computer processor or any one of the hardware devices listed above. The computer program instructions cause the processor to perform the processing functions described herein. The computer program instructions (e.g., software) can be stored in a computer useable medium, computer program medium, or any storage medium that can be accessed by a computer or processor. Such media include a memory device such as a computer disk or CD ROM, or the equivalent. Accordingly, any computer storage medium having computer program code that causes a processor to perform the processing functions described herein are with the scope and spirit of the present disclosure.

The breadth and scope of the present invention should not be limited by any of the above-described exemplary embodiments, but should be defined only in accordance with the following claims and their equivalents.

What is claimed is:

1. A method comprising:
   receiving, at a receiver, a received signal in time domain and obtaining a cyclic prefix (CP) correlation on the received signal, the CP correlation including spectral components associated with a plurality of possible cyclic prefix lengths;
   converting, in the receiver, the obtained CP correlation to frequency domain;
   distinguishing, in the receiver, spectral components associated with a first cyclic prefix length from spectral components associated with a second cyclic prefix length;
   calculating, in the receiver, a first metric based on the spectral components associated with the first cyclic prefix length;

calculating, in the receiver, a second metric based on the spectral components associated with the second cyclic prefix length;

setting, in the receiver, an order of cyclic prefix lengths based on a comparison of the first metric and the second metric with a threshold, the order including the first cyclic prefix length and the second cyclic prefix length; and completing, in the receiver, a synchronization process based on the order of the cyclic prefix lengths.

2. The method of claim 1, wherein the distinguishing the spectral components includes distinguishing the spectral components based on a correlation performed by using parameters associated with the first cyclic prefix length.

3. The method of claim 1, wherein the calculating the first metric includes calculating the first metric by using signal components in the received signal corresponding to a time period associated with the first cyclic prefix length, and by excluding signal components corresponding to a time period associated with the second cyclic prefix length.

4. The method of claim 1, wherein the calculating the second metric includes calculating the second metric by using signal components in the received signal corresponding to a time period associated with the second cyclic prefix length, and by excluding signal components corresponding to a time period associated with the first cyclic prefix length.

5. The method of claim 1, wherein the setting the order comprises:
setting the second cyclic prefix length before the first cyclic prefix length in the order when the first metric and the second metric are found to be above the threshold in the comparison.

6. The method of claim 1, wherein the setting the order comprises:
setting the second cyclic prefix length before the first cyclic prefix length in the order when the second metric is found to be above the threshold in the comparison.

7. The method of claim 1, wherein the setting the order comprises:
setting the first cyclic prefix length before the second cyclic prefix length in the order when the first metric is found to be above the threshold in the comparison.

8. The method of claim 1, herein the setting the order comprises:
setting the first cyclic prefix length before the second cyclic prefix length in the order when a ratio of the first metric to the second metric is found to be above the threshold in the comparison.

9. The method of claim 3, wherein the time period associated with the first cyclic prefix length is an OFDM symbol period associated with the first cyclic prefix length, and the time period associated with the second cyclic prefix length is an OFDM symbol period associated with the second cyclic prefix length.

10. The method of claim 4, wherein the time period associated with the first cyclic prefix length is an OFDM symbol period associated with the first cyclic prefix length, and the time period associated with the second cyclic prefix length is an OFDM symbol period associated with the second cyclic prefix length.

11. A receiver configured to receive a received signal in time domain and to obtain a cyclic prefix (CP) correlation on the received signal, the CP correlation including spectral components associated with a plurality of possible cyclic prefix lengths, the receiver comprising:

a converter configured to convert the obtained CP correlation to frequency domain;

a deciphering module configured to distinguish spectral components associated with a first cyclic prefix length from spectral components associated with a second cyclic prefix length;

a calculator configured to calculate a first metric based on the spectral components associated with the first cyclic prefix length, and to calculate a second metric based on the spectral components associated with the second cyclic prefix length; and an ordering module configured to set an order of cyclic prefix lengths based on a comparison of the first metric and the second metric with a threshold, the order including the first cyclic prefix length and the second cyclic prefix length, wherein a synchronization process is completed based on the order of the cyclic prefix lengths.

12. A method for determining a cyclic prefix from a plurality of available cyclic prefixes in a user equipment (UE), comprising:

(a) calculating, for a first cyclic prefix from among the plurality of available cyclic prefixes, an expected time of arrival of a downlink subframe that includes the first cyclic prefix;

(b) calculating a channel response of a channel over which the downlink subframe is to be received;

(c) determining, for a received downlink subframe, a determined time of arrival of the received downlink subframe based on the calculated channel response, the received downlink subframe including the first cyclic prefix;

(d) checking whether the determined time of arrival of the received downlink subframe is within an interval associated with the expected time of arrival;

(e) increasing a success count associated with the first cyclic prefix when the determined time of arrival of the received downlink subframe is within the interval associated with the expected time of arrival;

(f) repeating steps (a)-(e) for a second cyclic prefix from among the plurality of available cyclic prefixes to generate another success count; and (g) selecting one of the first cyclic prefix or the second cyclic prefix that has the highest respective success count.

13. The method of claim 12, wherein the increasing the success count includes increasing the success count when the determined times of arrival of a predetermined number of received downlink subframes are within the expected time of arrival.

14. The method of claim 12, wherein the checking includes checking whether a peak-to-average energy ratio associated with a channel impulse response of the received downlink subframe is greater than a threshold associated with the first cyclic prefix.

15. The method of claim 12, wherein the integer number of downlink subframes is an integer number of consecutive downlink subframes.

* * * * *

UNITED STATES PATENT AND TRADEMARK OFFICE
CERTIFICATE OF CORRECTION

PATENT NO.         : 8,718,159 B2
APPLICATION NO.    : 13/436369
DATED              : May 6, 2014
INVENTOR(S)        : Reddy et al.

It is certified that error appears in the above-identified patent and that said Letters Patent is hereby corrected as shown below:

In the Claims

Column 19, line 43, claim 8, please replace "herein" with --wherein--.

Signed and Sealed this
Twenty-ninth Day of July, 2014

Michelle K. Lee
*Deputy Director of the United States Patent and Trademark Office*